(No Model.)
T. G. KNIGHT.
PIPE COUPLING.
No. 260,580. Patented July 4, 1882.
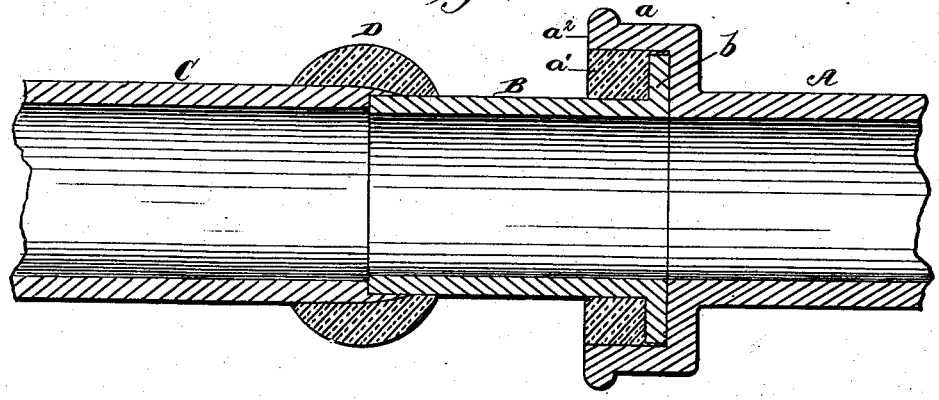
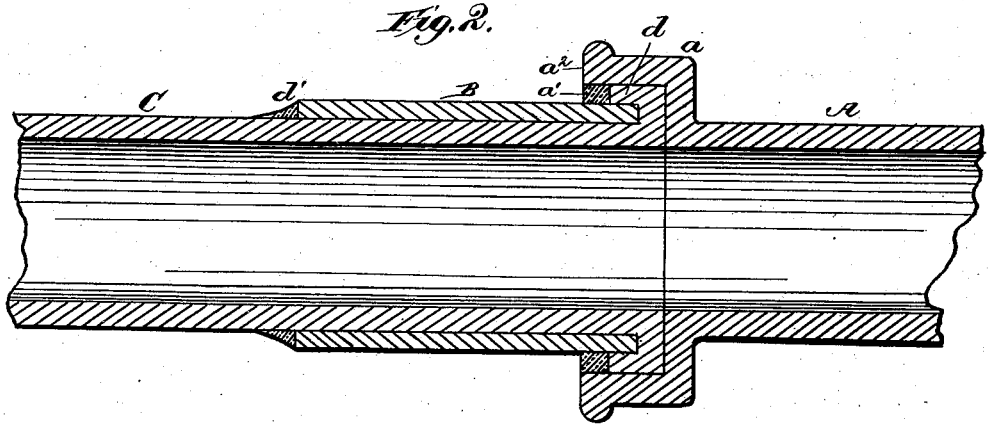
Witnesses.
Robert Everett
J. A. Rutherford
Inventor.
Thomas G. Knight.
By James L. Norris.
Atty.
N. PETERS. Photo-Lithographer. Washington, D. C.

so as to form a flange, $d$, around the end of the

UNITED STATES PATENT OFFICE.

THOMAS G. KNIGHT, OF BROOKLYN, NEW YORK.

PIPE-COUPLING.

SPECIFICATION forming part of Letters Patent No. 260,580, dated July 4, 1882.

Application filed February 18, 1882. (No model.)

*To all whom it may concern:*

Be it known that I, THOMAS G. KNIGHT, a citizen of the United States, residing at Brooklyn, in the county of Kings and State of New York, have invented new and useful Improvements in Pipe-Couplings, of which the following is a specification.

Prior to this invention various means have been adopted for coupling lead pipe to iron pipe, that most usually employed being a ferrule or coupling-tube of cast-brass or yellow-metal. The cast-metal coupling ferrule or tube is, however, open to the objections that it must be made very heavy in order to avoid, as far as possible, the sand-holes formed in casting the coupling-nipple, which construction considerably increases the cost of the article, and it is found that even where the cast-metal coupling ferrule or tube is made very heavy there will be more or less sand-holes, which, when the ferrule or tube is applied to couple the pipes, will allow deleterious gases to escape from the pipes into the house where they are located. In one instance a leaden coating has been cast or pressed around a cast-metal coupling or ferrule or tube, so as to prevent the escape of the deleterious gases; but in such case it has been found necessary to secure an iron plate to the leaden coating at the point where the molten lead employed for calking strikes the leaden coating in order to prevent the latter from becoming melted. This considerably increases the cost of the coupling, both by reason of the extra materials employed and by reason of the labor involved in manufacturing the coupling.

It is the object of this invention to obviate all of these objections, and to provide a single coupling-nipple which will be smooth and entirely free from sand-holes, and which will not require a covering of other metal to make a perfectly air-tight joint. To such end, in lieu of casting the coupling ferrule or tube, I provide a drawn or laminated metal coupling ferrule or tube which, while capable of being rapidly and cheaply produced, will necessarily be free from the sand-holes that are invariably found in the cast-metal nipples.

In the annexed drawings, Figure 1 represents a longitudinal section taken through a lead and iron pipe coupled together by a coupling ferrule or tube made in accordance with my invention. Fig. 2 is a like view, and represents a slightly-different form of coupling ferrule or tube, these two figures being made so as to show the way in which my improved drawn or laminated coupling ferrule or tube can be applied.

The letter A indicates the ordinary iron pipe, having at one end an enlarged mouth, $a$, adapted to receive either the flanged end of the coupling ferrule or tube or the flanged end of the lead pipe combined with a straight coupling ferrule or tube, as will be seen, and also to afford an annular space for the lead calking.

In Fig. 1, B indicates the coupling ferrule or tube, which will be composed of brass or copper, drawn or laminated, by means of any suitable machinery, into tubular shape, and formed with an annular flange, $b$, at one end. This coupling ferrule or tube, being a drawn, rolled, or laminated tube, in contradistinction to a cast tube, will be perfectly free from sand-holes, and hence will possess the advantages hereinbefore referred to. In this figure the flanged end of the coupling ferrule or tube is received within the enlarged mouth of the iron pipe A and fitted against the shoulder that is formed at the end of said pipe, after which the joint is calked, as at $a'$, by running molten lead into the space between the coupling ferrule or tube and the flange $a^2$ of the iron pipe and then impacting the lead in the usual way—as, for instance, by employing a cold-chisel and hammer. The opposite end of this coupling ferrule or tube is fitted against an annular shoulder formed in the end of the lead pipe C, and the joint between the two made tight and secure by means of the annular ring D, of lead or solder.

In Fig. 2 the coupling ferrule or tube B, which is formed by the same process as that described in connection with Fig. 1, is made throughout its entire length, the end flange being omitted. This form of coupling ferrule or tube is fitted upon the lead pipe C so as to leave a portion of the end of said tube projecting beyond the coupling-nipple. This projecting end of the lead pipe is then swaged or bent outwardly and back upon the coupling-tube, so as to form a flange, $d$, around the end of the latter, and the two thus combined are fitted in the enlarged mouth of the iron pipe A. The annular space between the coupling ferrule or tube and the horizontal flange $a^2$ of the iron pipe is calked with lead or solder, as before. A ring, $d'$, of solder will also be formed around the lead pipe at the opposite end of the coupling-nipple, as shown.

While I have mainly referred to the coupling ferrule or tube as being drawn, yet the same could be formed from rolled sheet metal brazed along the seam, so as to form a laminated tube, it being seen that in either case the tube is not formed of cast metal.

Any suitable or known machinery can be used for drawing the metal into tubular form or for rolling up sheet metal to form a tube, and hence need not be herein shown or described.

Having thus described my invention, what I claim is—

1. The combination, with the iron pipe A and the lead pipe C, of the drawn or laminated metal coupling ferrule or tube B, applied to couple the two together, and formed substantially in the manner and for the purpose described.

2. The combination, with the iron pipe A, having an enlarged mouth, of the lead pipe C and the drawn or laminated metal coupling ferrule or tube B, formed at one end with a flange received within the enlarged end of the iron pipe, and having its opposite end fitted within the lead pipe, the joints between the pipes and the coupling ferrule or tube being calked with lead or solder, substantially as described.

In testimony whereof I have hereunto set my hand in the presence of two subscribing witnesses.

THOMAS G. KNIGHT.

Witnesses:
DANL. W. NORTHUP,
CHAS. H. BURTIS.